No. 886,812. PATENTED MAY 5, 1908.
J. M. JIPPERSON.
LATHE CHUCK.
APPLICATION FILED AUG. 2, 1907.
2 SHEETS—SHEET 1.
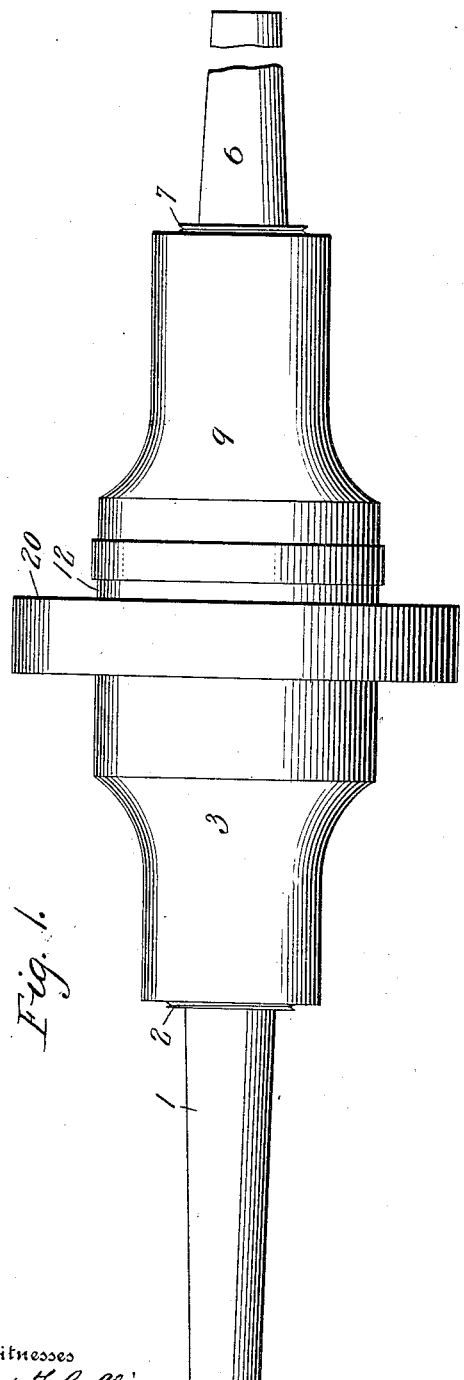
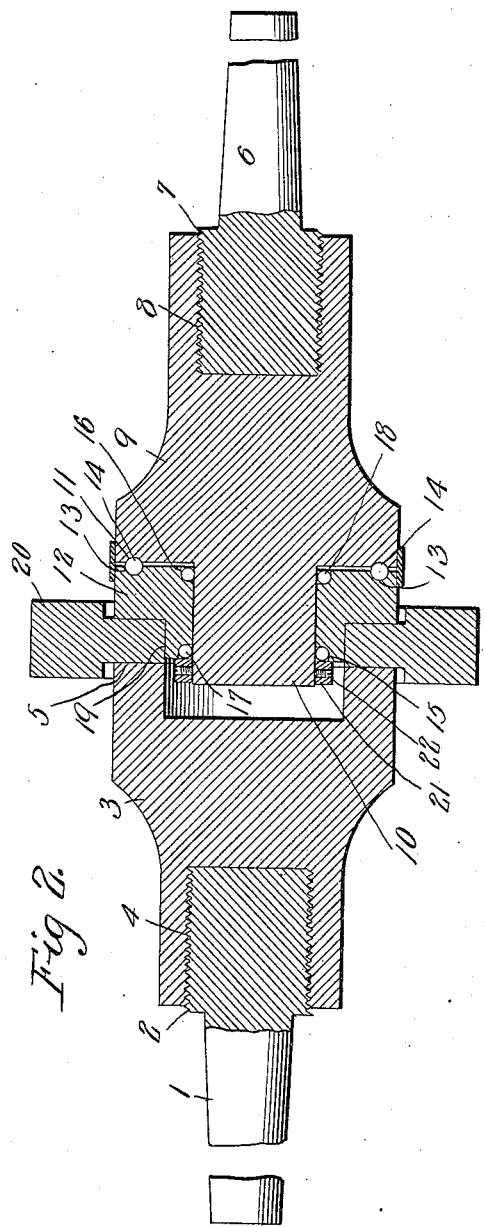
Witnesses
Jos. F. Collins
H. H. Simms
Inventor
John M. Jipperson
By Knight Bros.
Attorneys No. 886,812. PATENTED MAY 5, 1908.
J. M. JIPPERSON.
LATHE CHUCK.
APPLICATION FILED AUG. 2, 1907.
2 SHEETS—SHEET 2.
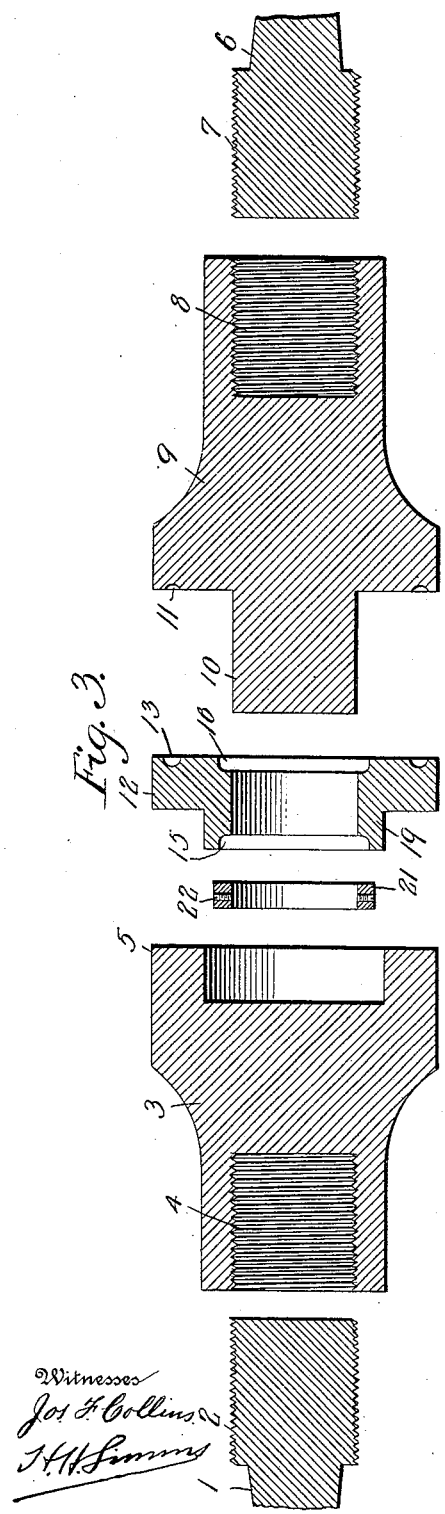
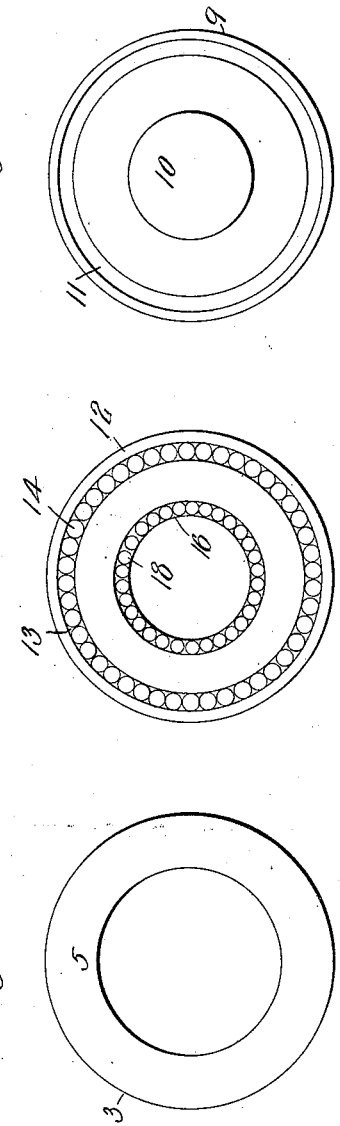
Inventor
John M. Jipperson
Witnesses
Jos. F. Collins
J. H. Simms
By Knight Bros
Attorneys

UNITED STATES PATENT OFFICE.

JOHN MARSEN JIPPERSON, OF DALLAS, TEXAS, ASSIGNOR OF ONE-SIXTH TO CHARLES P. DAWSON, ONE-SIXTH TO GILBERT H. IRISH, AND ONE-SIXTH TO WILLIAM H. JONES, OF DALLAS, TEXAS.

LATHE-CHUCK.

No. 886,812.  Specification of Letters Patent.  Patented May 5, 1908.

Application filed August 2, 1907. Serial No. 386,808.

*To all whom it may concern:*

Be it known that I, JOHN MARSEN JIPPERSON, a citizen of Denmark, residing at Dallas, in the county of Dallas and State of Texas, have invented certain new and useful Improvements in Lathe-Chucks, of which the following is a specification.

This invention relates to lathe chucks, and more particularly to a chuck for holding the space blocks of cotton gins while said blocks are being cut.

Heretofore, in the manufacture of space blocks, it has been necessary, when it was desirable to remove or fit a space block to the lathe, to stop the machine, thus consuming a great deal of time between the several operations.

It is an object of my invention to provide a chuck which will permit the space block to be put in and taken out of the lathe without stopping said lathe, thus saving a great deal of time, as by enabling one man to do the work of four.

With this and other objects in view, the invention consists in the parts and the combination of parts hereinafter set forth and more particularly pointed out in the appended claims.

In the drawings, Figure 1 is a side view of the lathe chuck; Fig. 2 is a longitudinal section; Fig. 3 is a detached sectional view; and Figs. 4, 5 and 6 are detail views respectively of the head chuck, the tail chuck, and the member that turns freely upon the tail chuck.

Referring more particularly to the drawings, 1 indicates a driving spindle held in the usual manner against axial movement. The outer end of this spindle is provided with external screw threads 2 upon which is screwed the head chuck 3 which is provided with an internally threaded socket 4 for the reception of the screw threaded portion of the spindle 1. The free end of the head chuck is provided with an annular projection 5.

Arranged in alinement with the head chuck is the stationary spindle 6 which is mounted in the usual manner so as to move axially. This spindle 6 carries a threaded portion 7 to which is fitted the socketed end 8 of the tail chuck 9. This tail chuck is formed with a central cylindrical projection 10 extending from the head chuck and with an annular groove 11.

Fitted upon and arranged to turn freely on the cylindrical projection 10 is a ring member 12. This ring member has that face, that is disposed toward the groove face of the tail chuck, provided with an annular groove 13, and in this groove and the groove on the tail chuck is arranged a series of balls 14. The ends of the ring member 12 are provided with annular grooves 15 and 16, in which are arranged two series of balls 17 and 18 bearing upon the cylindrical projection 10 of the tail chuck. The ring member 12 is further provided with an annular work seat 19 adapted to receive the ring shaped space block 20, the seat providing a projecting portion upon the ring member, adapted to enter the annular projection on the head chuck. To hold the ring member upon the tail chuck, there is provided a holding means in the form of a ring 21, which is adapted to surround that portion of the cylindrical projection 10 which projects through the ring member, screws 22 passing radially through the ring and holding it to the projection 10.

In operation, the head chuck 3 is set in rotation and the tail chuck 3 with the ring 12 is moved away from the head chuck. The space block is then fitted on the circular projection of the freely-turning work-supporting ring member, and the tail chuck, with the ring member and the space block, is moved toward the rotating head chuck, thus causing the space block to be clamped between the annular projection 5 and the work supporting ring member 12 and causing the space block to be rotated with the head chuck and operated upon by the usual cutting device to reduce the width of the space block. When the space block has been finished, the tail chuck is moved axially and carries the space block away from the head chuck 3, thus permitting the space block to be removed and another space block placed upon the ring member 12 without stopping the head chuck.

It is apparent that the ball bearing connection between the ring member 12 and the tail chuck will permit of the free movement of the ring member with very little friction.

Having thus described my invention, what I claim as new, and desire to secure by Letters Patent is:

1. The combination with a head chuck formed with an annular projection, of a tail chuck, and a member supported by the tail chuck and adapted to rotate thereon, said member being formed with a work-receiving projection adapted to enter the annular projection of the head chuck.

2. The combination of the head and tail chucks respectively adapted to be applied to rotating and non-rotating members of a lathe and constructed to clamp a work piece between them; the tail chuck being constructed with a cylindrical projection extending beyond its face and provided with a rotating work supporting part rotatably mounted on said projection and bearing against the face of the tail chuck, and constructed with a projection adapted to extend through the work piece and support the same and with a clamping face adapted to bear against the face of the work piece and clamp it against the head chuck.

3. The combination of a driving spindle carrying a head chuck formed with an annular projection, a holding spindle carrying a tail chuck constructed with a cylindrical projection, a rotary member mounted upon the projection of the tail chuck through the medium of anti-friction bearings and constructed with a cylindrical work receiving seat adapted to pass within the annular projection on the head chuck and also with a face co-öperating with said annular projection to clamp the work, and a holding ring upon the end of the tail chuck projection holding the rotary member thereon.

4. The combination of a driving spindle having one end screw threaded, a head chuck having an internally screw threaded socket fitted to the screw threaded end of the driving spindle and formed with an annular projection, a tail-chuck spindle having one end screw threaded, a tail chuck having an internally screw threaded socket fitted on the screw threaded end of the latter spindle and also having a cylindrical projection, a ring member turning freely upon the cylindrical projection and formed with an annular work receiving seat upon which the work may be clamped by the annular projection on the head chuck, and a holding ring surrounding the cylindrical projection on the tail chuck and holding the ring member on said cylindrical projection.

The foregoing specification signed at Dallas, Texas, this 4th day of April, 1907.

JOHN MARSEN JIPPERSON.

Witnesses:
WILLIAM HENRY JONES,
GILBERT H. IRISH.